(12) United States Patent
Surve et al.

(10) Patent No.: US 12,374,739 B2
(45) Date of Patent: Jul. 29, 2025

(54) INTEGRATED MANIFOLD

(71) Applicants: Shubhada Surve, Itasca, IL (US);
Nishaj Attassery, Saint Johns, FL (US);
Eapen Chacko, Itasca, IL (US)

(72) Inventors: Shubhada Surve, Itasca, IL (US);
Nishaj Attassery, Saint Johns, FL (US);
Eapen Chacko, Itasca, IL (US)

(73) Assignee: Robertshaw Controls Company, Itasca, IL (US)

( * ) Notice: Subject to any disclaimer, the term of this patent is extended or adjusted under 35 U.S.C. 154(b) by 848 days.

(21) Appl. No.: 17/576,320

(22) Filed: Jan. 14, 2022

(65) Prior Publication Data
US 2022/0255164 A1 Aug. 11, 2022

Related U.S. Application Data

(60) Provisional application No. 63/148,372, filed on Feb. 11, 2021.

(51) Int. Cl.
| H01M 10/6568 | (2014.01) |
|---|---|
| B60L 50/64 | (2019.01) |
| B60L 58/26 | (2019.01) |
| B60L 58/27 | (2019.01) |
| H01M 10/613 | (2014.01) |
| H01M 10/625 | (2014.01) |

(52) U.S. Cl.
CPC ......... *H01M 10/6568* (2015.04); *B60L 50/64* (2019.02); *B60L 58/26* (2019.02); *B60L 58/27* (2019.02); *H01M 10/613* (2015.04); *H01M 10/625* (2015.04); *H01M 2220/20* (2013.01)

(58) Field of Classification Search
CPC ........... H01M 10/6568; H01M 10/625; H01M 2220/20; H01M 10/613; B60L 50/64; B60L 58/26; B60L 58/27; F16L 41/023; F16L 41/03
See application file for complete search history.

(56) References Cited

U.S. PATENT DOCUMENTS

| 4,117,551 A * | 9/1978 | Brooks | E04F 21/12 366/339 |
|---|---|---|---|
| 10,627,001 B2 * | 4/2020 | Turner | F16K 15/026 |

* cited by examiner

*Primary Examiner* — Marina A Tietjen
(74) *Attorney, Agent, or Firm* — Miller & Martin PLLC

(57) ABSTRACT

A fluid manifold for cooling systems has parallel inlets directing flow through a base of a nozzle to an outlet which is preferably parallel to the inlets. The pressure drop from the inlets to the outlet is preferably less than 3 psi and the inlets have inlet portions with check valves connected thereto.

19 Claims, 2 Drawing Sheets

INTEGRATED MANIFOLD

CLAIM OF PRIORITY

This application claims the benefit of U.S. Provisional Patent Application No. 63/148,372 filed Feb. 11, 2021, which is incorporated by reference in its entirety.

FIELD OF THE INVENTION

The present invention relates to a manifold for use in various fluid systems and more particularly to an integrated manifold adapted to a constrained space application such as within a cooling systems of electric vehicles.

BACKGROUND OF THE INVENTION

A customer had three inlet pipes which needed to merge into a single pipe with a manifold construction to accommodate this design. While various manifolds are available in the marketplace, the applicant needed a design to accommodate physical and technical constraints of the system at issue. The design needed to prevent backflow through any of the inlet ports from any of the other inlet ports. Accordingly, an improved design was deemed to be necessary.

SUMMARY OF THE INVENTION

It is an object of many embodiments of the present invention to provide an improved manifold.

It is another object of many embodiments of the present invention to provide an improved integrated manifold having three inlets and a single outlet.

It is another object of many embodiments of the present invention to provide three parallel inlets to a manifold with a single outlet parallel with the inlets.

It is another object of many embodiments of the present invention to provide an improved integrated manifold receiving three parallel inputs after being directed through check valves to prevent backflow with the manifold reducing a total cross-section perimeter about the inlets to an outlet cross-section perimeter while meeting desired flow and pressure drop requirements.

Accordingly, in accordance with a presently preferred embodiment of the present invention, an improved integrated manifold is provided which has multiple, such as three, preferably parallel inlet ports which each respectively receive check valves therein or there at which then direct fluid flow into the manifold body at a base at a first receiving end and then direct flow along a narrowing cross-section to a discharge end at an outlet. The outlet portion of the manifold has an axis preferably parallel to axes of the inlets. Respective check valves may be located in each of the inlets of the manifold to prevent backflow through any of the inlets. A perimeter extending about the inlets is preferably constrained within a perimeter of the receiving end of the manifold taken along parallel planes.

It is desirable for many embodiments that the outlet have a rate maximum flow rate of 120 liters per minute handling 40 liters per minute maximum flow rate from each inlet with a pressure drop of less than 3 PSI at the maximum flow rate. It is further desirable for many embodiments that the working temperature be operable in a temperature range of −40° Celsius to a 105° Celsius and have a maximum burst pressure of 400 PSI internal pressure. Other embodiments may be configured for these and/or other engineering limitations.

BRIEF DESCRIPTION OF THE DRAWINGS

The particular features and advantages of the inventions with other objects will become apparent from the following description taken in connection with the accompanying drawings in which.

DETAILED DESCRIPTION OF THE PREFERRED EMBODIMENT

Figure 1:
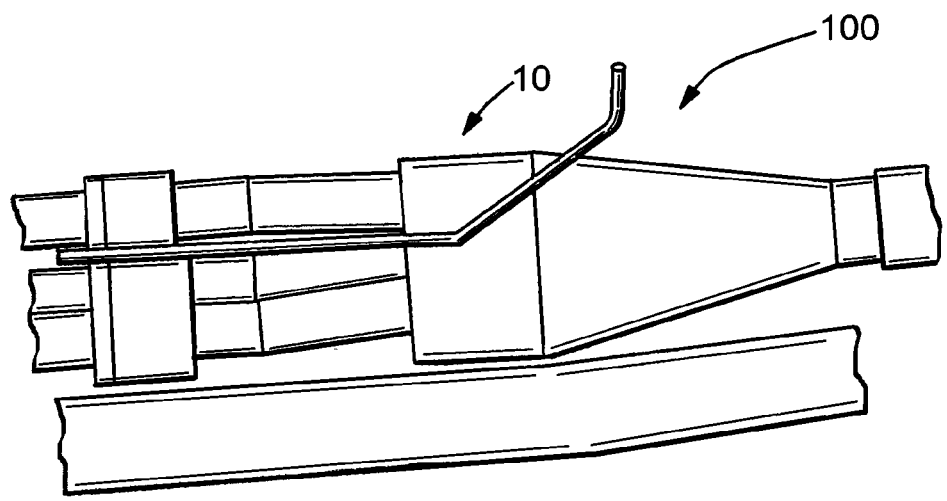
FIG. 1 is a perspective view of a cooling portion of the cooling system utilizing the integrated manifold of the presently preferred embodiment of the present invention.

FIG. 1 shows a manifold 10 installed internal to a fluid system 100. Specifically, for some embodiments the manifold 10 may be utilized with cooling systems of electric vehicles. In this embodiment, the manifold 10 receives as first, second and third inlets 12,14,16, each of which preferably receive check valve such as check valve 18 therein which may be received within quick connect inlets 20,22,24 respectively. Check valve(s) 18 prevent backflow through any of the inlets 12,14,16.

Furthermore, inlets 12,14,16 may have inlet portions 26,28,30 which may be parallel to one another. Inlets 12,14,16 are preferable contained within a total perimeter 32 defined as the smallest perimeter extending about all of the inlets 12,14,16 such as in a plane parallel to a plane of the base 54. Total perimeter 32 is smaller than base perimeter 34 at receiving end 36 of the manifold 10 which receives the entering portions 38,40,42 of the inlets 12,14,16 into the receiving end 36 of the manifold 10 with the receiving portions 38,40,42 contained within the base perimeter 34 as well.

Although three inlets 12,14,16, are illustrated some embodiments may have two, four or other number of inlets 12,14,16. Total perimeter 32 would still fit within base perimeter 34 of receiving end 36 taking the parallel nature into account. The receiving portions 38,40,42 are preferably angled relative to the inlet portions 26,28,30. The manifold 10 proceeds from the receiving end 36 towards the discharge end 44 at outlet 46 with the perimeter 34 decreasing in cross-sectional area as compared to perimeter 48 at outlet 44 for many embodiments. The decreasing cross sectional area may be a nozzle 52 for some embodiments.

Figure 2:
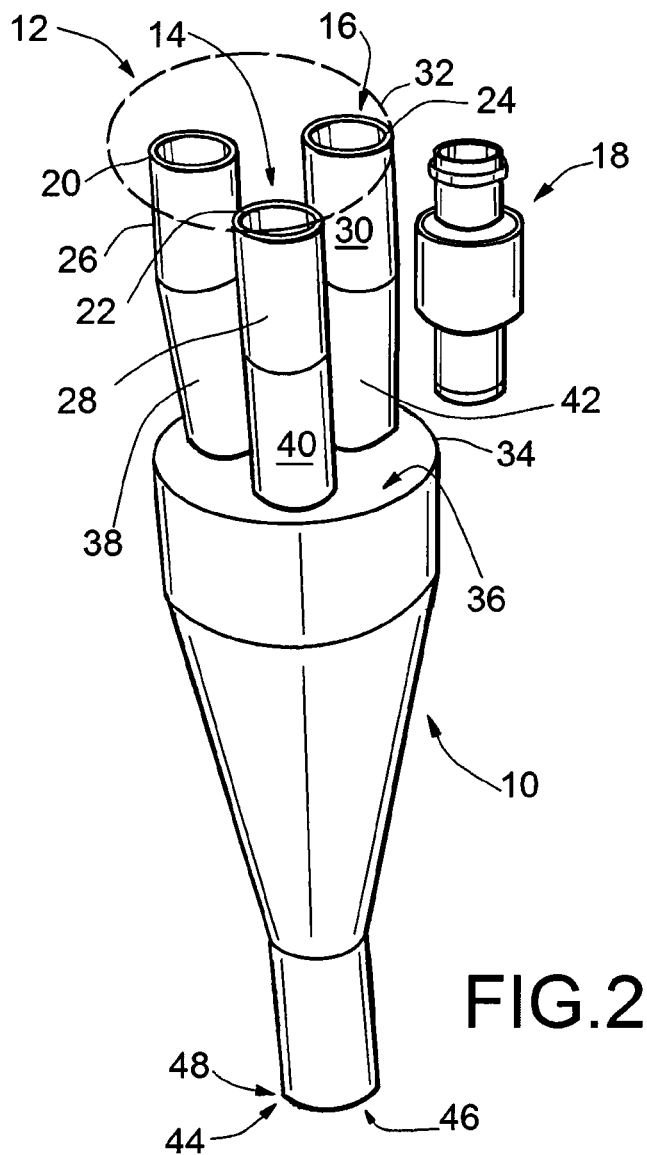
FIG. 2 is a side perspective view of the manifold shown in FIG. 1 removed from the cooling system.
Figure 3:
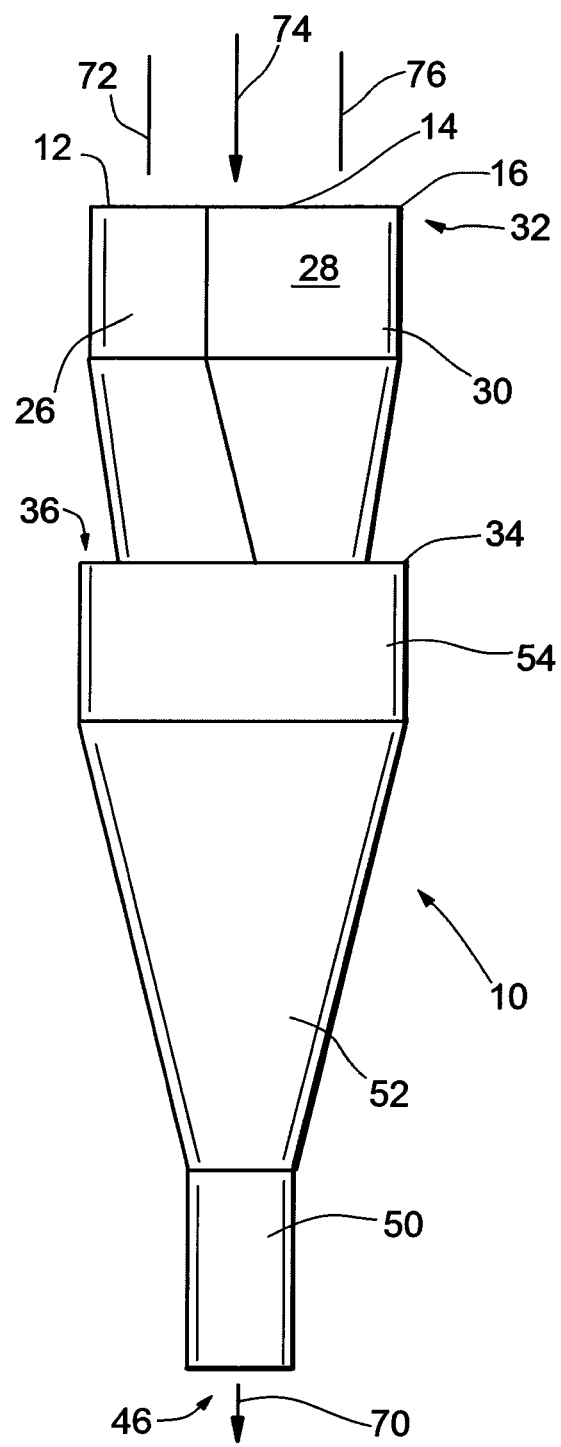
FIG. 3 is a side plan view of the manifold shown in FIGS. 1 and 2.
Figure 4:
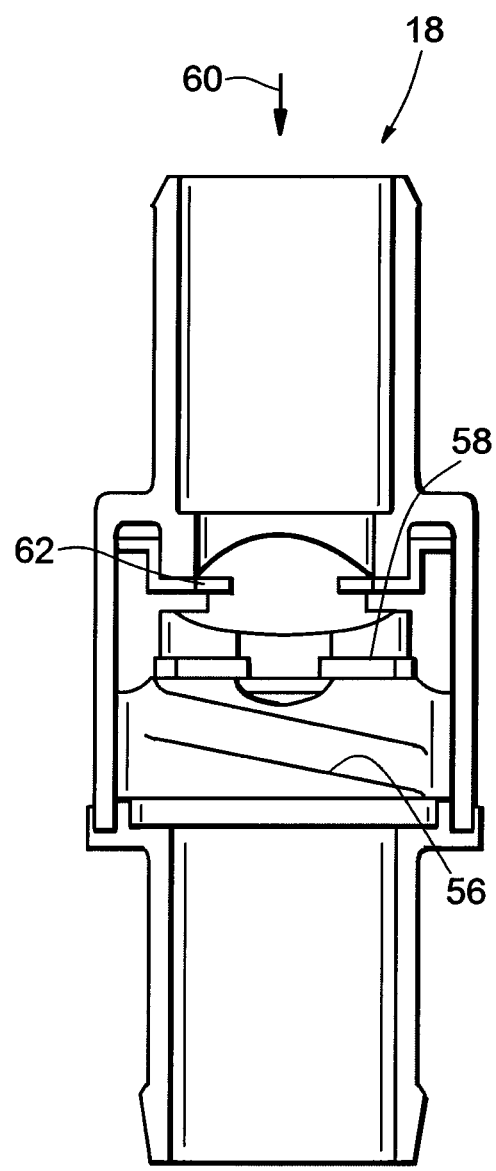
FIG. 4 is a cross sectional view of one of the check valves removed from the connection of the manifold in FIG. 1 and shown components of FIG. 2.

In the illustrated embodiment, the total perimeter 32 may be a circumference as the base perimeter 34 at the receiving end 36. The circumference or total perimeter 32 may be smaller than and even disposed internal to the circumference of the base perimeter 34 with the total perimeter 32 as illustrated in FIG. 2 preferably parallel to the base perimeter 34 along spaced apart parallel planes. Outlet 46 may extend from outlet extension 50 which may proceed from a nozzle 52 from a base 54 with the base 54 having the receiving end 36 thereon for at least some embodiments. Check valve(s) 18 may have an internal spring 56 with movable seal 58 so that if flow is in the direction of normal flow 60 the seal 58 is displaced from seat 62 permitting flow in the direction 60 through the check valve 18. However, if a flow were attempted in the opposite direction, the seal 58 contacts the seat 62 to prevent backflow through the check valve 18.

Each of the respective inlets 12,14,16 may have check valve 18 therein such as connected at a quick connect inlet 20,22,24 such as at an NW20 quick connect inlet or other appropriate connection.

For many embodiments the NW20 VDA quick connect provides the quick connect inlets 20,22,24 for the inlets 12,14,16. Other embodiments may have other structures. For many embodiments the maximum flow of 40 liters per minute may be provided through each of the inlets 12,14,16 up to a maximum combined flow rate of 120 liters per minute. It is further preferred for some embodiments that the manifold 10 have a pressure drop of less than 3 PSI at a maximum flow rate. For many embodiments a working temperature of −40° Celsius to 105° Celsius can be provided. Furthermore, burst pressure of up to 400 PSI may be withstood by many embodiments. A minimum distance from the inlets 12,14,16 to the outlet 18 is preferably about 600 millimeters such as 606.358 millimeters or greater. The outlet portion 50 preferably has an axis 70 which is parallel to each axis 72,74,75 of each of the respective inlets 12,14,16.

What the manifold 10 does that prior art constructions do not provide in an adequate manner is an ability to provide a small pressure drop thus allowing for smaller pumps, an ability to provide a working fluid such as ethylene, glycol and water mixture to heat or cool electric batteries for use in electric vehicles.

Each of the inlets 12,14,16 preferably have check valves 18 to prevent backflow in the system through any of the respective inlets 12,14,16.

By having a small pressure drop such as no more than three PSI, relatively small pumps can be utilized to pump the pump cooling mixtures through the manifold 10 when utilized for such embodiments.

What is convenient about at least some embodiments of this manifold 10 as opposed to other designs, is an ability to provide parallel inlets 12,14,16 within a total perimeter 32 which is constrained if moved perpendicular to the plane it is in to be coplanar with the base 54 by a base perimeter 34 the receiving end 36 of the base 54 of the manifold 10. Axes 72,74,76 of the inlets 12,14,16 may also be parallel to the axis 70 of the outlet portion 50 of the outlet 46. This provides a compact, low pressure drop and relatively high flow rate construction for receiving multiple inputs into the manifold in a desirable manner.

Numerous alterations of the structure herein disclosed will present themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having set forth the nature of the invention, what is claimed herein is:

1. A manifold for a cooling fluid system comprising:
   separate parallel inlets comprising at least a first and a second inlets, said inlets respectively having check valves at inlet portion and at least selectively directing fluid through a base at a receiving end of a nozzle through entering portions of the inlets;
   a total perimeter extending about a smallest perimeter which extends about and around the inlets at the base;
   the base having a base perimeter, and the base perimeter extends about the total perimeter;
   the nozzle having an outlet at a discharge end and a conically narrowing cross sectional area portion beginning at the base where fluid enters the nozzle from the entering portions of the inlets, the discharge end opposite the receiving end, and the outlet parallel to the inlets; and
   the fluid selected from at least one of water, ethylene and glycol, with the manifold having a maximum pressure drop of 3 psi from any of the inlets to the outlet.

2. The manifold of claim 1 wherein the check valves are connected to the inlet portions of the inlets with quick connects.

3. The manifold of claim 1 wherein the inlets further comprises a third inlet.

4. The manifold of claim 3 wherein the third inlet is parallel to the first and second inlets.

5. The manifold of claim 1 wherein the base is planar and perpendicular to the inlets and outlet and the conically narrowing cross sectional area begins at the base.

6. The manifold of claim 5 wherein the working temperature of the manifold is from 40 C to 105 C.

7. The manifold of claim 1 wherein a burst pressure of the manifold exceeds 400 psi.

8. The manifold of claim 1 wherein the inlets direct fluid to receiving portions, and the receiving portions are angled relative to the inlets with the inlets spaced apart from one another.

9. The manifold of claim 8 wherein the receiving portions are angled relative to the base and the base is planar and perpendicular to the inlets and outlet.

10. The manifold of claim 9 wherein the check valves are connected to the inlet portions of the inlets with quick connects.

11. The manifold of claim 10 wherein the inlets further comprises a third inlet.

12. The manifold of claim 11 wherein the third inlet is parallel to the first and second inlets.

13. The manifold of claim 12 wherein the nozzle conically narrows from the base to the outlet.

14. The manifold of claim 13 wherein the base is planar and perpendicular to the inlets and outlet.

15. The manifold of claim 14 wherein the working temperature is from 40 C to 105 C.

16. A manifold for a fluid system comprising:
   separate inlets comprising at least a first, a second and a third inlets, said inlets respectively at least selectively directing fluid received from respective check valves through a base of a receiving end of a nozzle through entering portions of the inlets;
   a total perimeter extending about a smallest perimeter which extends about largest perimeters of the inlets;
   the base having a base perimeter, and the base perimeter extends parallel to and about the total perimeter;
   the nozzle having an outlet at a discharge end, and a conically narrowing cross sectional area portion where fluid enters the nozzle from the entering portions of the inlets and mixes in the conically narrowing cross sectional area portion downstream of the base, the discharge end opposite the receiving end; and
   the fluid selected from at least one of water, ethylene and glycol, with the manifold having a maximum pressure drop of 3 psi from any of the inlets to the outlet.

17. The manifold of claim 16 wherein the outlet is parallel to the inlets.

18. The manifold of claim 17 wherein the inlets are spaced apart from one another.

19. The manifold of claim 18 wherein the inlets direct flow through receiving portions into the base, said receiving portions are angled relative to the inlets and are contained within a perimeter parallel to the base perimeter.

\* \* \* \* \*